(12) United States Patent
Riza (10) Patent No.: US 6,360,037 B1
(45) Date of Patent: Mar. 19, 2002

(54) POLARIZATION-BASED FIBER-OPTIC SWITCH

(75) Inventor: Nabeel Agha Riza, Orlando, FL (US)

(73) Assignee: Nuonics, Inc., Orlando, FL (US)

( * ) Notice: Subject to any disclaimer, the term of this patent is extended or adjusted under 35 U.S.C. 154(b) by 0 days.

(21) Appl. No.: 09/334,159

(22) Filed: Jun. 16, 1999

(51) Int. Cl.⁷ .............................................. G02B 6/35
(52) U.S. Cl. ........................ 385/22; 385/47; 359/128
(58) Field of Search ............................... 385/15–24, 39, 385/47; 359/124–128, 154, 156, 159, 168–170, 320

(56) References Cited

U.S. PATENT DOCUMENTS

| | | | |
|---|---|---|---|
| 4,478,494 A | 10/1984 | Soref | |
| 4,720,171 A | 1/1988 | Baker | |
| 4,917,452 A | 4/1990 | Liebowitz | |
| 4,948,229 A | 8/1990 | Soref | |
| 4,969,720 A | * 11/1990 | Lins et al. ................... | 359/302 |
| 4,991,924 A | 2/1991 | Shankar et al. | |
| 5,162,944 A | 11/1992 | Yamamoto et al. | |
| 5,363,228 A | * 11/1994 | DeJule et al. ............... | 359/117 |
| 5,381,250 A | 1/1995 | Meadows | |
| 5,414,540 A | 5/1995 | Patel | |
| 5,477,350 A | * 12/1995 | Riza et al. .................... | 359/39 |
| 5,606,439 A | 2/1997 | Wu | |
| 5,694,233 A | 12/1997 | Wu et al. | |
| 5,724,165 A | * 3/1998 | Wu .............................. | 359/117 |
| 5,822,471 A | * 10/1998 | McGinnis ...................... | 385/1 |

OTHER PUBLICATIONS

N.A. Riza and S. Yuan. Low optical interchannel crosstalk, fast switching speed, polarisation independent 2×2 fibre optic switch using ferroelectric liquid crystals; Electronic Letters Jun. 25, 1998 vol. 34 No. 13, pp. 1341–1342.

Hakamata, Yoshizawa, and Kodaira. a 1.3 um Single–Mode 2×2 Liquid Crystal Optical Switch; IEICE Trans. Commun., vol.. E77–B, No. 10, Oct., 1994, pp. 1249–1255.

R.E. Wagner and J. Cheng. Electrically controlled optical switch for multimode fiber aplications. Allied Optics, Sep. 1, 1980 vol. 19, No. 17; pp. 2921–2925.

N.A. Riza. Liquid Crystal–based Optical Controllers for Phased–Array Antennas. SPIE, vol. 2155; pp. 169–180.

N.A. Riza. Ferroelectric Liquid Crystal Polarization Switching–based High Speed Multi–Wavelength Add/Drop Filters using Fiber and Array Waveguide Gratings; SPIE, vol. 3490, pp. 335–338.

* cited by examiner

Primary Examiner—Akm E. Ullah
Assistant Examiner—Michelle R. Connelly-Cushwa
(74) Attorney, Agent, or Firm—James H. Beusse, Esq.; Beusse, Brownlee, Bowdoin & Wolter, PA (57) ABSTRACT

A fiber-optic switch based on a unique retro-reflection scheme is used to create a 2×2 switch having two fiber-optic circulators and two polarization rotation devices. Passive and active noise filtering techniques maintain the high performance of the switch even when the polarization rotation devices have poor performance. The switch also has the advantage of zero relative time delay between two channels for any of two switch settings making it appropriate for cascading switching stages. The preferred embodiment of the 2×2 optical switch also has a simple design in terms of alignment since only two optical fibers need to be aligned with each other. The switch is also scalable to form N 2×2 optical switch modules for use in add/drop, N-wavelength, multiple fiber-optic networks where its novel retro-reflective characteristic allows the use of half of the required wavelength multiplexers/demultiplexers in the system compared to a transmissive switch add/drop filter. An alternative embodiment uses a single polarization beam splitter to form a circulator-free transmissive mode 2×2 optical switch with comparable crosstalk but higher alignment complexity.

7 Claims, 4 Drawing Sheets

POLARIZATION-BASED FIBER-OPTIC SWITCH

FIELD OF THE INVENTION

The present invention relates to fiber-optic switching devices and, more particularly, to a fiber-optic (FO) switch using polarization switching for routing multiple light signals in optical networks such as wavelength division multiplexed (WDM) optical communications, distributed sensor networks, and photonic signal processing systems requiring optical routing and gain control.

BACKGROUND OF INVENTION

The FO switch is a basic building block for many optical applications such as routing in fiber communications networks, photonic signal processing, distributed optical sensing, and optical controls. The desired features for a FO switch include low optical loss (e.g., <1 dB), low interchannel crosstalk (<−30 dB), and simple to align low cost designs for large scale commercial production and deployment. Depending on the application, FO switching speeds can range from nanoseconds to several milliseconds. An attractive technology for making FO switches is via the use of liquid crystal (LC) technology for making light polarization rotators that when placed between polarization sensitive optics forms a switch.

Prior art LC FO switches have suffered from various limitations such as excessive crosstalk, difficult alignment, unbalanced loss between the switch states, and unequal time delays between the switched states. Unequal time delays can cause timing problems when cascading small (e.g., 2×2) switches to make larger N×N switches (e.g., N=50) in very wide bandwidth (e.g., 10 Gigabits/sec) fiber-optic communication systems. Crosstalk significantly depends on the quality of the polarization switches. For instance, a major problem with LC based FO switches is that as the LC cell quality goes down, the FO switch crosstalk gets worse. This problem is recognized in the industry and several patents directed to reducing crosstalk have been issued. However, it is not believed that prior patents have adequately resolved the problems arising in this area from fiber alignment. See, for example, A. P. Baker, "Liquid Crystal Optical Switching Device Having Reduced Crosstalk," U.S. Pat. No. 4,720,171, Jan. 19, 1988; J. S. Patel and Y. Silberberg, "Frequency Selective Optical Switch Employing A Frequency Dispersive Element, Polarization Dispersive Element, and Polarization Modulating Elements," U.S. Pat. No. 5,414,540, May 9, 1995; N. K. Shankar, J. A. Morris, C. R. Pollack, C. P. Yakymyshyn, and W. Whitehead, "Optical Switches Using Cholesteric or Chiral Nematic Liquid Crystals and Method of Using The Same," U.S. Pat. No. 4,991,924, Feb. 12, 1991; M. Liebowitz, "Liquid Crystal Optical Switching Device," U.S. Pat. No. 4,917,452, Apr. 17, 1990: R. A. Soref, "Optical Switches Using Ferroelectric Liquid Crystals ," U.S. Pat. No. 4,948,229, Aug. 14, 1990; M. R. Meadows, "Electro-optical Switch With 4-port Modules With Electro-optic Polarization Rotators," U.S. Pat. No. 5,381,250, Jan. 10, 1995; K. T. Yamamoto, Y. H. Itoh, T. Nagayami, "Optical Space Switch And Network For Such Optical Space Switches," U.S. Pat. No. 5,162,944, Nov. 10, 1992; Y. Hakamata, T. Yoshizawa, and T. Kodaira, "A 1.3μm Single-Mode 2×2 Liquid Crystal Optical Switch," IEICE Trans. Commun., Vol. E77-B, No. 10, 1994; R. A. Soref, "Optical Bypass Switch," U.S. Pat. No. 4,478,494, Oct. 23, 1984. "R. E. Wagner and J. Cheng, "Electrically Controlled Optical Switch For Multimode Fiber Applications," Applied Optics, Vol. 19, pp. 2921–2925, 1980.

Proper use of electronically active and passive polarization components appropriately placed in an optical structure such as a polarization switched optical delay line can greatly suppress structure noise, as suggested in N. A. Riza, "Liquid crystal-based optical controllers for phased array antennas," *Optoelectronic Signal Processing for Phased Array Antennas IV Conference Proceedings of the* SPIE, Vol. 2155, pp. 169–180, Jan. 1994. Using this concept of proper positioning of polarization components, the patent by K. Y. Wu, "Fault tolerant optical routing switch," U.S. Pat. No. 5,724,165, 1998, introduces a low crosstalk 2×2 FO switch. Nevertheless, this transmissive mode switch has high fiber alignment complexity along with an unequal time delay problem between the switch states. Specifically, the two input fibers of the switch have to be simultaneously aligned to the two output fibers through a complex switching structure, making a long duration and tedious alignment task during switch fabrication. Furthermore, it uses several large birefringent beam displacing optics that are costly, adding to the overall expense on building such a switch.

One approach that improves switch alignment is to use an optical structure interconnected with FO circulators. A commercial FO circulator such as available from JDS Fitel, Canada, has three fiber ports. One port is reversible with light flow in and out of the port. The other two ports are a unidirectional input port and a unidirectional output port. Recently, the circulator has been used in a number of liquid crystal-based optical switches where the LC structure for light beam flow control is interconnected with circulators. A Fabry-Perot LC filter is used in the tuning structure proposed in Kuang-Yi Wu, "Tunable Add-Drop Optical Filter," U.S. Pat. No. 5,606,439, Feb. 25, 1997. Another similar design but using stacked waveplates is by Kuang-Yi Wu and Jian-Yu Liu, "Switchable Wavelength Router," U.S. Pat. No. 5,694,233, Dec. 2, 1997.

SUMMARY OF THE INVENTION

The present invention addresses the crosstalk and alignment problems of a 2×2 optical switch. The present inventor disclosed an improved fiber-optic switch in a presentation entitled "Ferroelectric liquid crystal polarization switching-based high speed multiwavelength add/drop filters using fiber and array-waveguide gratings," *OC'98, Optics in Computing European Optical Society Topical Meeting Digest Series,* pp. 335–338, Belgium, Jun. 17–20, 1998. The accompanying paper on LC switching describes structure using cube polarization beam splitters (PBSs) for a two circulator structure. It is believed that this is the first time that an LC polarization rotation-based switching structure using a low cost cube PBS was sandwiched between two circulators to form a 2×2 FO switch. Using this retroreflective two circulator approach, the switching structure has only two ports for alignment and not four like in the transmissive 2×2 switches mentioned earlier. Using two circulators makes the switch alignment a simpler task, thus making a more economical device. In addition, the use of low cost cube PBS's reduces overall switch cost. A further disclosure was made on Jun. 25, 1998 by the present inventor and a co-author in an article entitled "Low Optical Interchannel Crosstalk, Fast Switching Speed, Polarization Independent 2×2 Fiber Optic Switch using Ferroelectric Liquid Crystals," Electronics Letters, Vol.34, No.13, Jun. 25, 1998 by N. A. Riza and Shifu Yuan.

Further improvement on the applicant's FO switch invention include by N. A. Riza described earlier in N. A. Riza, "Ferroelectric liquid crystal polarization switching-based high speed multiwavelength add/drop filters using fiber and array-waveguide gratings," *OC'98, Optics in Computing European Optical Society Topical Meeting Digest Series*, pp. 335–338, Belgium, Jun. 17–20, 1998, and N. A. Riza and Shifu Yuan. A highly useful module for WDM add-drop routing applications using a unique LC switch structure based on low cost cube PBS's for sandwiching between two circulators to form 2×2 FO switch invention with low complexity alignment and zero-relative time delay between the switch settings. Additionally, a compact transmissive 2×2 FO switch structure is disclosed for general purpose 2×2 switch applications where the routing channel numbers are small (e.g., 5).

More particularly, the present invention includes a novel 2×2 FO switch structure based on a retro-reflection scheme coupled with FO-circulators, cube PBS's, and polarization switch devices such as 90 degree twisted nematic liquid crystals (TNLC's) device incorporating unique passive and active noise filtering techniques inherent in the switch design to make it appropriate for use even when the 90 degree liquid crystal polarization rotation performance is low (e.g., 20 dB extinction ratio). The switch also has the advantage of zero relative time delay between the two channels for any of the two switch settings making it appropriate for cascading switching stages. The use of cube PBS's reduces cost, while maintaining high crosstalk performance. The inventive 2×2 optical switch is simple in design and assembly in terms of alignment since only two fibers need to be aligned instead of four. It is also scalable to form N 2×2 optical switch modules for use in add/drop WDM networks where its retroreflective characteristic allows the use of half of the required multiplexers/demultiplexers in the system. For smaller (e.g., 10) fiber channel count switching systems, an alternate transmissive 2×2 FO switch is proposed with good crosstalk performance, although with higher optical alignment sensitivity.

BRIEF DESCRIPTION OF THE DRAWINGS

For a better understanding of the present invention, reference may be had to the following detailed description taking in conjunction with the accompanying drawings in which.

DETAILED DESCRIPTION OF THE INVENTION

Figure 1A:
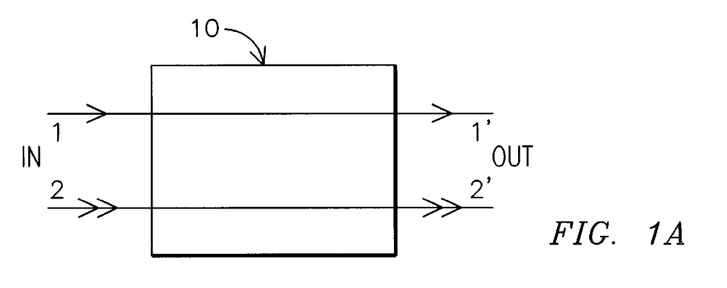
FIGS. 1A and 1B are schematic representations of a 2×2 FO switch in a transmissive, non-exchanging state and a transmissive exchanging state, respectively.
Figure 1B:
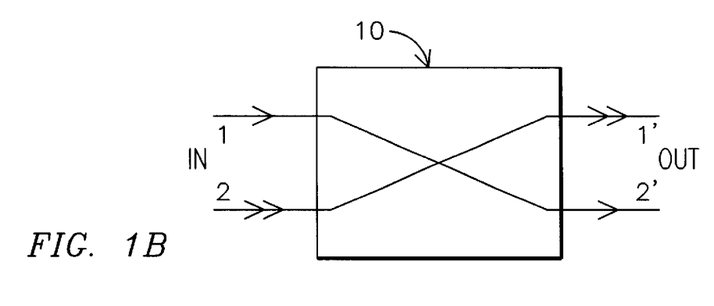

A transmissive 2×2 FO switch differs from a reflective 2×2 FO switch. A functional representation of a typical transmissive 2×2 optical switch 10 is shown in FIGS. 1A and 1B and comprises two input ports (1 and 2) and two output ports 1 and 2). There are two states of the switch 10, a non-exchanging and an exchanging state. In the non-exchanging state, FIG. 1A, signals from input ports 1 and 2 are routed to output ports 1' and 2', respectively. In the exchanging state, FIG. 1B, signals from input ports 1 and 2 are routed to output ports 2' and 1', respectively. As can be seen, the optical switch 10 requires two pairs of fibers for the input and output ports. This can lead to alignment limitations, since each input fiber has to be aligned with each of the output fibers.

Figure 1C:
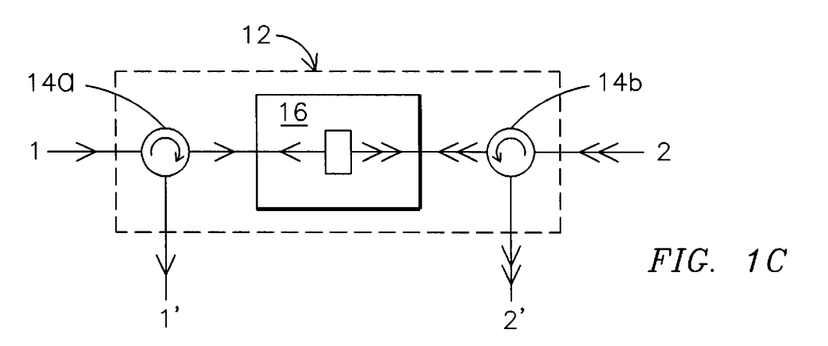
FIGS. 1C and 1D are schematic representations of an FO retro-reflective switch in a non-exchanging state and an FO retro-reflective switch in an exchanging state, respectively.
Figure 1D:
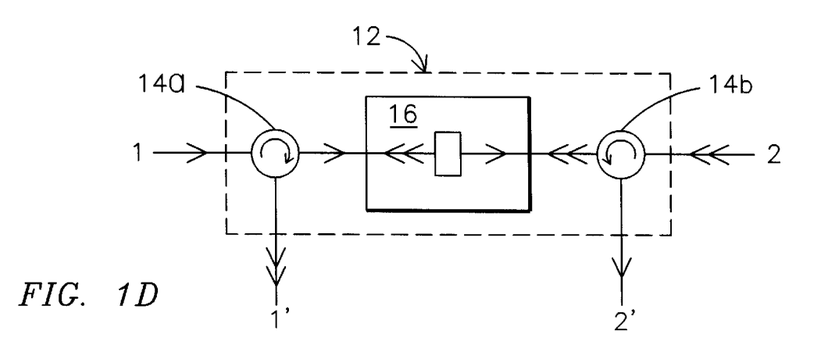

An alternative reflective-type 2×2 optical switch 12 is shown in FIGS. 1C and 1D. Switch 12 makes use of commercially available FO-circulators 14a, 14b that are combined with a switched optical retro-reflection module 16. The switched retro-reflection module 16 can either retro-reflect the optical input signal or let it pass straight through. In the non-exchanging state of FIG. 1C, light from the input port 1 passes through the circulator 14a and is retro-reflected back by the switching module 16 through the circulator 14a to the output port 1'. Similarly, the optical signal from input port 2 is retro-reflected and routed to output port 2'. In the exchanging state of FIG. 1D, the retro-reflection is cancelled and optical signals from input ports 1 and 2 travel straight through the module to output ports 2' and 1', respectively. Note that the 2×2 optical switch design of FIGS. 1C and 1D only requires alignment of two optical fibers, i.e., one optical path which is very important from an assembly point of view, and forms the basis of the present invention.

Figure 2:
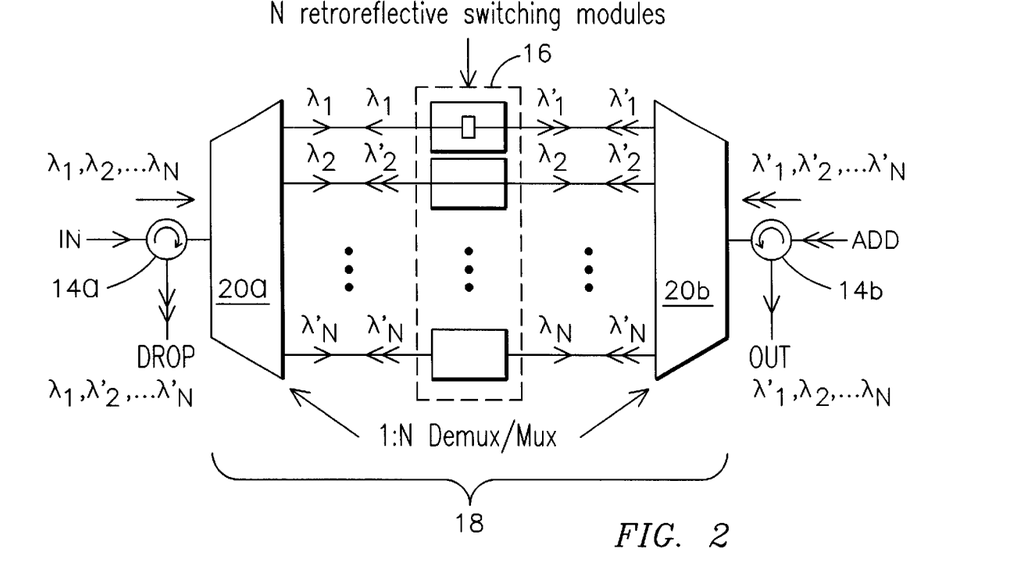
FIG. 2 illustrates an active add/drop WDM filter architecture based on the inventive switched retro-reflection 2×2 optical switch in which wavelengths $\lambda_2 \ldots \lambda_N$ from the IN-port are routed to the OUT-port, and wavelength $\lambda_1$ is routed to the DROP-port while wavelengths $\lambda'_2, \ldots, \lambda'_N$ from the ADD-port are routed to the DROP-port and wavelength $\lambda'_1$ replaces wavelength $\lambda_1$ to the OUT-port.

The switched retro-reflection module can be used in a variation of an add/drop WDM filter with the great advantage of reduced number of WDM multiplexers and demultiplexers as schematically represented in FIG. 2. Optical signals from the IN-port, encoded on different wavelengths (e.g., $\lambda_1, \lambda_2, \ldots \lambda_N$), are directed into the add/drop WDM filter 18 through circulator 14a. Depending on the state of the N optical switching modules 16, light can either pass straight through (e.g., $\lambda_2, \ldots \lambda_N$), or reflected back (e.g., $\lambda_1$). Conventional optical multiplexers 20a, 20b (MUX, DEMUX) are used to separate and redirect the optical frequencies between the circulators 14a, 14b. Signals of wavelength $\lambda_1'/-\lambda'_N$ from the ADD-port are routed to the OUT-port or to the DROP-port in the same manner.

Figure 3A:
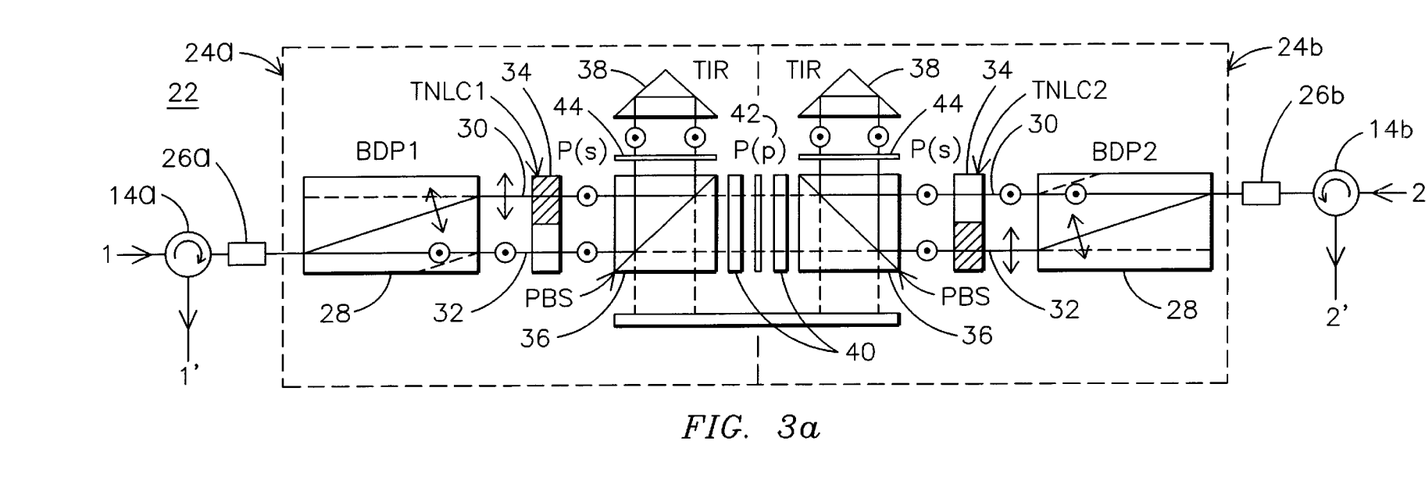
FIGS. 3a and 3b illustrate preferred embodiments of the inventive retro-reflection-type 2×2 optical switch for opposite polarization states showing the signal and leakage noise propagation through the module in which the solid line represents a signal path and the dashed line represents a leakage noise path.
Figure 3B:
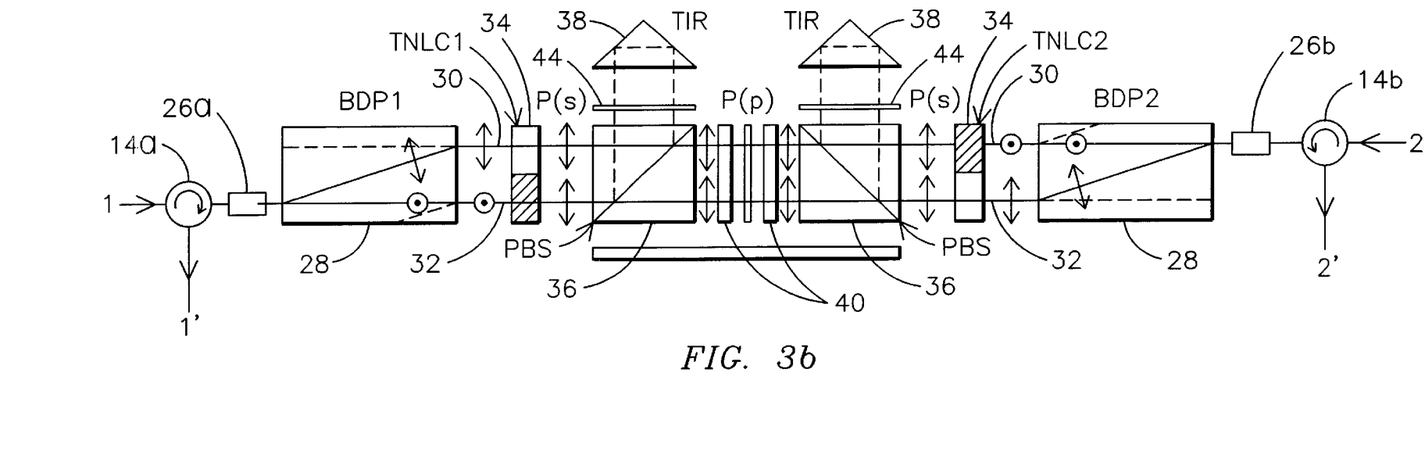

FIGS. 3A and 3B are schematic representations of a preferred embodiment of a 2×2 optical switch 22 based on a pair of switched retro-reflection modules 24a, 24b and optical circulators, 14a, 14b. FIG. 3A shows a non-exchanging state while FIG. 3B shows an exchanging state. Light is directed into the switching modules 24a, 24b using FO lens 26a, 26b such as graded index (GRIN) lens FO-collimators. In each module, light first passes through a beam-displacing prism (BDP) 28 and is spatially split into two orthogonally polarized beams 30 and 32 (horizontal or p-polarized and vertical or s-polarized) indicated respectively by a double-headed arrow and a circled dot. Each of these spatially separated beams goes through a pixel of a 90 degree linear polarization rotation electro-optic switch 34 such as a twisted nematic liquid crystal (TNLC) device which allows individual beam control.

A typical TNLC device such as may be used for switch 34 is a nematic liquid crystal device in which the molecules of the first and the last layer are arranged with a 90° twist-angle. The polarization of the incident light is aligned along one of the two molecular directions. When no electric field is applied across the liquid crystal cell, the twist exists and the polarization of the incident light rotates by 90°. On the other hand, when an electric field is applied to the liquid crystal cell, all the molecules in the liquid crystal become parallel to each other and parallel to the direction of propagation of the light. Thus, the twist vanishes and the light does not see any birefringence and thus it keeps its original linear polarization.

The two states of the optical switch are shown in FIGS. 3A and 3B. The non-exchanging state of FIG. 3A occurs when the p-polarized component of the incident light passes through a first pixel of TNLC1 device 34 that is "on" and changes to s-polarized light which is reflected by 90° in the PBS cube 36. A total internal reflection prism (TIR) 38 is then used to retro-reflect the beam back through the same optical elements, but slightly displaced in space, so that after reflection from the PBS cube 36 the light passes through a second pixel of the TNLC1 device 34 that is "off". The s-polarized light then travels straight through the BDP1 prism 28, GRIN lens FO-collimator 26a and is directed via the FO-circulator 14a to output port 1'. At the same time, the s-polarization component 32 of the incident light travels through exactly the same optical path but in the reverse direction. First it goes through a second pixel of the TNLC1 device 34 that is "off" so that beam polarization remains unchanged and is reflected by 90° in the PBS cube 36 into TIR prism 38. The beam is retro-reflected in the TIR prism 38 back through the PBS cube 36 to the first pixel of TNLC1 device 34 that is "on" which changes the beam to p-polarization. The p-polarized light is then deflected by the BDP prism 28 into the FO-collimator lens 26a and via the FO-circulator 14a to output port 1'. Similarly, channel 2 is directed through identical optical elements in module 24b to output port 2'. Note that in either channel the two polarization components travel through exactly the same length optical paths.

In the exchanging state of FIG. 3B, the light travels straight through each module 24a, 24b from one FO-collimator to the other. In particular, the two polarization components of module 24a are spatially separated by the BDP prism 28 and the p-polarized light passes through the first pixel of TNLC1 device 34 that is now set "off" and thus travels unaffected through the two PBS cubes 36. Beam 30 then passes through the first pixel of TNLC2 device 34 of module 24b that is set "on", changes to s-polarization and travels straight through BDP2 prism 28 of module 24b, and via the circulator 14b to output-port 2'. Similarly, the s-polarization beam 32 of module 24a travels through the second pixel of TNLC1 device 34 of module 24a, which is "on" and changes to p-polarization, and thus travels straight through the two PBS cubes 36. The beam 32 goes through the second pixel of TNLC2 device 34 of module 24b, and is directed by the BDP prism 28 of module 24b to the FO-collimator 26b and via the circulator 14b to output-port 2'. Signal from input-port 2 follows the reverse direction and exits the switch from output-port 1'.

An important issue of any 2×2 switch is that there should be no relative time delay between the two different channels in the two different switching states. That means that the optical paths of both the exchanging and the non-exchanging states must have exactly equal optical path lengths. Unlike previous low interchannel crosstalk designs that have a small relative optical path length difference between their two settings and the two channels, the present invention has completely equivalent optical path lengths. This is accomplished by adjusting the distance between the two PBS cubes 36 to be equal to the optical path length through the retro-reflection TIR prisms 38. Two glass plates 40 of the appropriate thickness can be added between the two PBS cubes 36 to equalize path lengths in a small package. It is also important that the two polarization components of each channel travel through equal optical path lengths. In the exchanging state this is accomplished by using the TIR prism 38 for retro-reflecting back the light. The TIR prism 38 displaces spatially the retroreflected beam from the incoming beam. Thus, each polarization component passes twice through the BDP prism 28, once as a p-polarized beam and once as an s-polarized beam. Thus, each beam goes through one deflection and one straight transmission in the BDP prism 28. In the exchanging state, the equal path between the two polarization components is accomplished by orienting BDP2 prism 28 of module 24b inversely with respect to prism 28 of module 24a as shown in FIG. 3, so that each polarization component undergoes again one deflection and one straight transmission through the BDP prisms.

The switching speed of the TNLC switch 34 is a well-studied issue and typical numbers are in the 10–50 ms range. There is a small asymmetry in the switching speed between the case where the switch is turned from "on" to "off" and when it is turned from "off" to "on". Nevertheless, the slower of the two switching responses is compatible with the standard optical communication requirements. For faster speeds in the microseconds domain (e.g., 35 microseconds), ferroelectric liquid crystal polarization switches can be used. Other options for the electrically active polarization devices include multiple quantum well devices, polymer dispersed liquid crystals, acousto-optic devices, micromachined birefringent stress devices such as piezoelectric/piezoceramic devices (e.g., lead zirconate tantilate (PLZT)), and other electro-optic crystals.

An important issue in optical switches is the interchannel leakage noise that affects the interchannel crosstalk of the optical switch. Leakage noise is defined as the optical power of the portion of the input signal that leaks to the undesired port. Interchannel crosstalk is the ratio of the optical power that is routed from the undesired input-port to the desired output-port over the optical power that is routed from the desired input-port to the same desired output-port. In the present switch there are two sources of leakage noise. These are the PBS cubes 36 and the polarization rotation devices 34.

The polarization leakage due to the PBS cube 36 has to do with the transmission and reflection characteristics of the optical element. Typical numbers of the transmission and reflection efficiency of the PBS cube for the two polarization components are $T_p=95\%$, $R_p=5\%$, $T_s=0.1\%$, and $R_p=99.9\%$ [see *CVI Catalog*, CVI Corporation, Albuquerque, N. Mex., 1998.] Thus, the limited extinction ratio performance of the low cost PBS cube can limit the interchannel isolation for the two switching states. In order to suppress the leakage noise due to the PBS cube, passive noise filtering can be used. Passive noise filtering includes the use of high extinction-ratio (ER) sheet polarizers 42 at the output ports of the PBS cubes 36. For example, if a p-polarizer 42 is positioned between the two PBS cubes 36, only p-polarized light is transmitted between the cubes 36, while undesired s-polarized leakage is blocked. Additionally, sheet polarizers 44 can be positioned between the PBS cubes 36 and the TIR prism 38 and oriented with their polarization axis parallel to the s-polarization, and thus suppress any undesired p-polarization leakage.

The second polarization leakage noise source is the polarization rotation device 34 such as the TNLC devices. This is because in reality these devices do not exactly rotate the polarization by 90° when they are "on", and because they slightly rotate the incident polarization when they are "off". Hence, a portion of the desired signal can leak through the system as noise and end up at the undesired port, hence deteriorating the switching performance. Passive noise filtering does not fully suppress the TNLC-based leakage noise because this noise is mostly of the same polarization as the axis of the high ER polarizers 42, 44 and thus leaks through them. In order to address the above limitation, an active noise filtering technique, previously used to suppress polarization leakage noise in photonic delay line applications (see N. A. Riza and N. Madamopoulos, "Characterization of a ferroelectric liquid crystal-based time delay unit for phased array antennas," Journal of Lightwave Technology, Vol. 15, No. 7, pp. 1088–1094, July 1997.) can be used. The active noise filter is formed by an active polarization rotation element (e.g., a TNLC device) and a polarizer at the output of the system. The active noise filter technique is based on the fact that the polarization of the leakage noise coming from the undesired input-port and which has leaked through the passive noise filters, is always orthogonal compared to the polarization of the signal. Thus, a polarizer of the proper orientation at the output port would suppress the noise. Nevertheless, depending on the optical switch setting the signal can be either s- or p-polarized while the noise can be p- or s-polarized. Thus, a TNLC-device and a polarizer can control the state of polarization of both the signal and the leakage noise, and thus suppress the noise for any of the switch settings. In the illustrative design, the output of each module 24 for one channel happens to be the input for the other channel. Thus, the active noise filter already exists in the module and no additional optical components or active devices are required.

As an example, and referring to FIG. 3A for the p-polarized portion of the input beam from port 1, the returned desired signal before the BDP prism 28 is p-polarized. Polarization leakage coming from port 2 is due to the pixel of TNLC2 device 34 of module 24b that is "off". That means that some part of the input s-polarization changes to p-polarization (even though the device is "off") and passes through the PBS cubes 36 and through the passive noise filter 42. After passing through the PBS cubes 36, the p-polarization is rotated to s-polarization by TNLC1 device 34 of module 24a, which is "on". The s-polarization then passes through the BDP prism 28 of module 24a and never reaches the FO-collimator 26a. Note that there is going to be some polarization leakage as the p-polarized leakage noise passes through the TNLC1 device 34 of module 24a, which will be eventually coupled into the FO-collimator 26a. Nevertheless, this polarization leakage noise is low. Very important in the active noise filtering technique is that the pixels of the input and output TNLC devices 34, which correspond to the same beam, always operate out of phase. That is when one is "on" the other is "off". This orthogonal drive configuration is very important because TNLC devices do not perform equally for both of their states. Thus, in one of the two states a greater amount of polarization leakage noise is introduced in the module.

This orthogonal drive configuration can give balanced leakage noise performance for both optical switch settings as also suggested for acousto-optic switch technologies in N. A. Riza and J. Chen, "Ultrahigh—47 dB optical drop rejection multiwavelength add-drop filter using spatial filtering and dual bulk acousto-optic tunable filters," Optics Letters, Vol. 23, No. 12, pp. 945–947, Jun. 15, 1998.

Typical ER numbers for the TNLC devices 34 today under room temperature conditions are >25 dB that will lead to an excellent −50 dB crosstalk level. Nevertheless, even under very low or high temperature conditions for the TNLC device, switch performance is not expected to deteriorate drastically using this low noise design. A worst case scenario of 10 dB optical isolation for the two states of the TNLC devices is expected to give interchannel crosstalk numbers of −20 dB.

The estimated optical insertion loss for the switch 22 of FIG. 3A based on commercial component specifications is presently around 1 dB. This insertion loss depends first on the structure loss of the switch, which includes loss due to reflection, scattering and absorption, and second on the polarization leakage noise that is either filtered by the noise filters 42, 44 or that leaks to the undesired ports. Note that the optical insertion loss deteriorates when the TNLC devices 34 do not perform well. This is due to the higher leakage noise present in the switch. Additional loss due to the GRIN-to-GRIN coupling efficiency is estimated at <0.5 dB.

Important issues, apart from the ones discussed in the previous section, for the implementation of a deployable add/drop WDM filter such as the one shown in FIG. 2 is the ease in assembly, the small size, cost, and the scalability of the 2×2 optical switch 22. The ease in assembly of the proposed 2×2 optical switch was previously discussed and is based on the fact that only two fibers need to be aligned in the switch. The individual switches can then be fiber-connectorized with the WDM multiplexers/demultiplexers and these in turn with the FO-circulators 14. The size of the proposed optical switch can be as small as 6.5 cm×1.2 cm. Because alignment is simple and low cost cube PBS's are used, the switch can be economical.

Figure 4A:
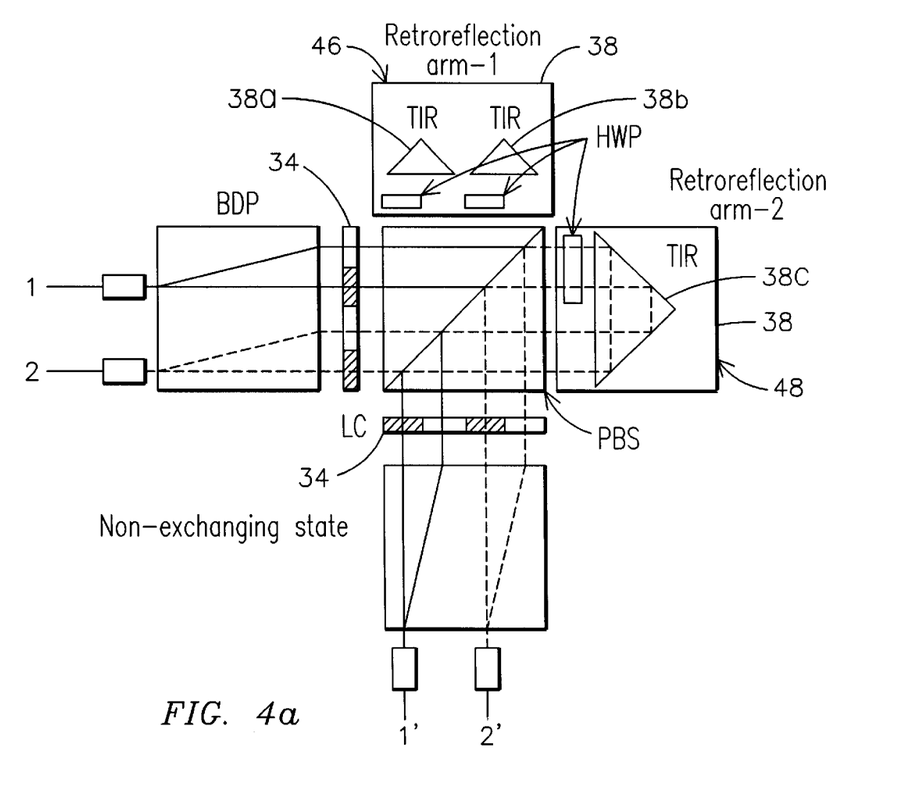
FIGS. 4a and 4b illustrate alternative non-exchanging and exchanging states, respectively, of embodiments of a transmissive-type 2×2 optical switch based on a single cube PBS architecture in which the solid line represents input signal 1 path, and the dashed line represents input signal 2 path.
Figure 4B:
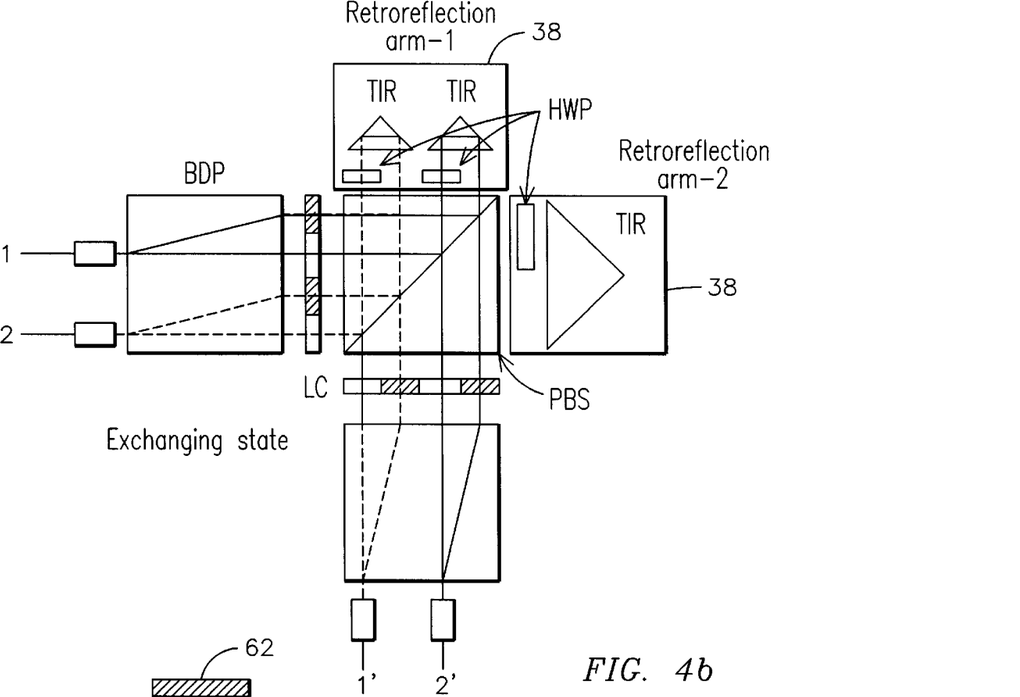

For low (e.g., 5) fiber channel count switching systems, a transmissive switch design requiring more alignment steps is perhaps economical. In an alternate embodiment of the invention, a transmissive 2×2 FO switch design based on a single PBS approach is shown in FIGS. 4A and 4B. In this design, the beam paths are folded using TIR prisms 38. The folding of the beam paths improves the interchannel crosstalk because the PBS-based noise passes twice through the PBS. In this design the two polarization components of each channel can follow either the retro-reflection arm 46 which corresponds to the non-exchanging state, or the retro-reflection arm 48, which correspond to the exchanging state. In the retro-reflection arm 46, two small TIR prisms 38a, 38b are used to exchange the position of the s- and p-polarized beams of each channel, so that they propagate through equivalent optical paths. The larger TIR 38c in the retro-reflection arm 48, exchanges the position of the two channels as a whole, and at the same time exchanges the position of the two polarization components in the same channel so that equal path lengths are traveled. This folded architecture gives interchannel crosstalk performance in the −42 dB range using TNLC device 34 extinction ratios of 25 dB. Nevertheless, the inability to use passive noise filters limits the interchannel crosstalk compared to the preferred embodiment proposed switched-retro-reflection based 2×2 optical switch using two circulators 14 as shown in FIG. 3A.

This folded architecture is also more alignment intensive since it requires alignment of four fibers and three prisms.

Note that compact packaging can lead to an "all in one unit" N-wavelength add-drop programmable router with simple fiber alignment. This is done for the embodiment in FIG. 3A by placing the 1:N Demux/Mux (see FIG. 2) such as a planar optic diffraction grating between the GRIN fiber lens 26 and the polarizing beam displacing prism 28 at both ports of the switch. Here, the dispersive element spatially separates and combines the N wavelengths in the direction in or out of the paper. The embodiment in FIG. 4 can also incorporate this dispersive element in a similar fashion to lead to a compact N-wavelength switch.

Figures 5A, 5B:
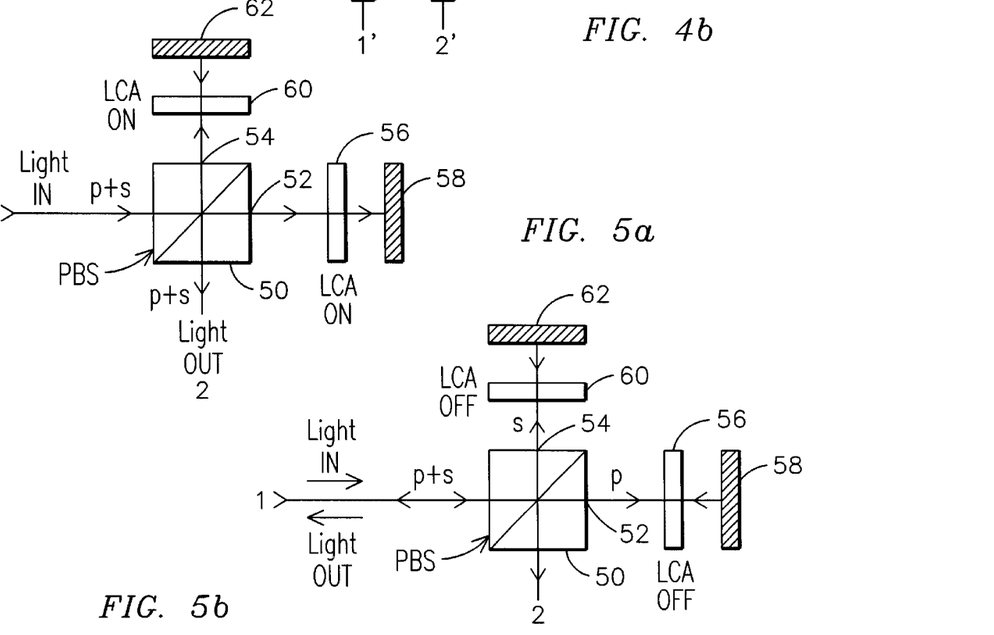
FIGS. 5A and 5B illustrate alternate embodiments of a switching module in pass through and reflective states, respectively.

FIG. 5A illustrates a polarization independent, 1×2 optical switch. FIG. 5A illustrates the operation of the switch in a transmissive or pass-through mode in which light entering the input terminal 1 goes through the switch and exits the output terminal 2. FIG. 5B indicates the switch in a reflective mode or state in which light entering terminal 1 is fully reflective back out of terminal 1.

The switch comprises a polarization beam splitter 50 which operates in the same manner as was described with respect to the polarization beam splitter in FIG. 3. Light entering terminal 1 includes both horizontal and vertically polarized (p and s) components. When the light strikes the beam splitter 50, it is separated into p and s components with the p component passing straight through the splitter and exiting out the terminal 52. From terminal 52, the p-polarized light passes through a liquid crystal array 56 having the characteristic of rotating the polarization by a quarter wavelength such that light exiting the array 56 has a polarization half way between horizontal and vertical. This light is then reflected from mirror 58 back through the array 56 where it is rotated an additional quarter wave so that the originally p-polarized light has now been rotated into a vertical polarization or s-polarized light. When the s-polarized light strikes the beam splitter 50, it is deflected at 90° and exits out the output port 2.

The original portion of the input light with s-polarization which was deflected out the terminal 54 of beam splitter 50 also passes through a liquid crystal array 60 which rotates the polarization by 45°. This light then strikes the mirror 62 and is reflected back through the array 60 which rotates it an additional 45° so that now the original s-polarized light is now p-polarized. The p-polarized light re-enters the terminal 54 and passes straight through the beam splitter 50 exiting out the output port 2.

In FIG. 5A, the liquid crystal arrays 56, 60 were in the excited or ON condition so that the light passing through the arrays is rotated by 45° in each passage. In FIG. 5B, the arrays 56 and 60 are in their unexcited or OFF condition so that the light passes through the array without any polarization change. In such event, the splitter 50 separates the horizontal and vertical polarized beams such that the horizontal or p-polarized component of the beam passes straight through the splitter 50, through the liquid crystal array 56 and is reflected off the mirror 58 back through the splitter 50 exiting out the input terminal 1. The vertical or s-polarized portion of the beam is deflected at 90° from the splitter 50, passes through the liquid crystal array 60 and is reflected off the mirror 62 back into the splitter 50 where it is again deflected at 90° and exits out the input port 1.

As can be seen from the discussion above of FIGS. 5A and 5B, a very simple switching module can be constructed for a situation in which there is only a single input port and a single output port but in which the input light may be either switched to the output port or reflected back into the input port.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed is:

1. An optical switching module for selectively switching a light beam entering a first input port between first and second output ports, said modules comprising:

an optical circulator having a unidirectional input port, a unidirectional output port and a bi-directional port;

a beam displacing prism optically aligned with said bi-directional port of said circulator, said prism being arranged to separate light exiting said bi-directional port into a p-polarized beam and an s-polarized beam;

polarization control means having a first mode for receiving and passing input light such that a polarization of said input light is unchanged and having a second mode for changing the polarization of said input light by 90°, said control means being aligned with said prism for changing polarization of one of said p-polarized and s-polarized beams to form a pair of beams with common polarization;

a polarization beam splitter for passing input light of a first polarization along a first path and for reflecting input light of a second polarization along a second path, said beam splitter being optically aligned with said polarization control means;

an internal reflection prism optically aligned in said second path for reflecting light back into said beam splitter whereby light having said second polarization is directed in a reverse direction through said beam splitter, passing back through said polarization control means and recombining in said beam displacing prism to enter said bi-directional port of said circulator through said circulator and be directed out of said unidirectional output port; and said light of the first polarization being directed through said beam splitter to said second output terminal.

2. An assembly comprising at least two of the modules of claim 1 coupled in back to-back arrangement and optically aligned along a path of said light of said first polarization, whereby light entering the unidirectional input port of each optical circulator in each module can be selective directed out the unidirectional output port of one or another of the circulators.

3. The assembly of claim 2 and including a polarized filter positioned between each of the modules for substantially blocking light of the second polarization.

4. The assembly of claim 3 and including at least one light transmissive spacer positioned between the modules for equalizing the light transmissive path length for light of each polarization.

5. The assembly of claim 2 and including a light absorbing member overlaying surfaces of said beam splitters.

6. An optical switching module for selectively switching a light beam entering an input port between first and second output ports, said module comprising:

an optical circulator having a unidirectional input port, a unidirectional output port and a bi-directional port;

an input port for receiving a light beam having horizontal and vertical polarization components said input port being optically coupled to said unidirectional input port of said circulator;

a polarization beam splitter optically aligned with said unidirectional output port and adapted for separating said light beam into horizontal and vertical polarization components, said beam splitter being operative to pass one of said polarization components therethrough without deflection and to deflect another of said polarization components angularly with respect to said one of said components;

at least a pair of active polarization rotation devices positioned about said beam splitter and aligned respectively to optically pass one and another of said polarization components, said polarization rotation devices having a first mode for rotating a light beam of one polarization into a light beam of another polarization and having a second mode for passing a light beam without polarization rotation;

at least first and second mirrors aligned in an optical path with said polarization rotation devices for reflecting light passing through each of said devices in a reverse direction back through said devices, said rotation devices operable in said first mode to switch polarization of each to another polarization so as to direct into said beam to exit a second output port of said beam splitter, rotation devices being operable said second mode to maintain each beam component polarization and to said beam to exit a first output port of said splitter, , said first output port being aligned with said unidirectional output port of said circulator whereby said light beam exits through said circulator; and another optical circulator coupled to said second output port of said beam splitter whereby a light beam can enter and exit through said second output port.

7. The optical switching module of claim 6 wherein each said beam component passes twice through a respective one of said polarization rotation devices and is rotated by about 45° in each transition to affect a 90 degree rotation.

* * * * *